United States Patent [19]

Christenson

[11] 3,867,648

[45] Feb. 18, 1975

[54] PULSE WIDTH SHORTENING CIRCUIT

[75] Inventor: Gerald A. Christenson, Lombard, Ill.

[73] Assignee: GTE Automatic Electric Laboratories Incorporated, Northlake, Ill.

[22] Filed: Jan. 2, 1974

[21] Appl. No.: 429,995

Related U.S. Application Data

[62] Division of Ser. No. 375,253, June 29, 1973, Pat. No. 3,818,367.

[52] U.S. Cl. .................. 307/266, 307/246, 307/265, 307/273, 328/58

[51] Int. Cl. .............................................. H03k 5/04

[58] Field of Search ........... 307/231, 246, 266, 265, 307/273, 293; 328/58

[56] References Cited

UNITED STATES PATENTS

| | | | |
|---|---|---|---|
| 3,193,701 | 7/1965 | Lawhon | 307/266 |
| 3,209,173 | 9/1965 | Rumble | 307/266 |
| 3,588,547 | 6/1971 | Greenblum | 307/293 |
| 3,617,760 | 11/1971 | Jones | 307/246 |
| 3,653,018 | 3/1972 | Budrys | 307/231 |
| 3,654,495 | 4/1972 | Shinoda et al. | 307/293 |
| 3,713,010 | 1/1973 | Drushel | 307/231 |

*Primary Examiner*—Stanley D. Miller, Jr.
*Attorney, Agent, or Firm*—James V. Lapacek

[57] ABSTRACT

Apparatus for generating a first series of output pulses and a corresponding series of delayed output pulses, each delayed pulse being adjustably delayed with respect to the corresponding first output pulse by a selectable time interval. In a specific embodiment of the invention, the apparatus comprises an astable oscillator for generating the first output pulses, a monostable oscillator for generating adjustably delayed pulses responsive to the corresponding first pulses, and pulse shortening means for processing the adjustably delayed pulse to provide delayed output pulses of reduced pulse width.

1 Claim, 7 Drawing Figures

PULSE WIDTH SHORTENING CIRCUIT

This is a division, of application Ser. No. 375,253, filed June 29, 1973, now U.S. Pat. No. 3,818,367.

BACKGROUND OF THE INVENTION

The present invention relates generally to pulse generating apparatus and more particularly to an adjustable slow and delayed pulse oscillator for generating a first series of slow output pulses and a corresponding series of output pulses delayed with respect to the corresponding slow pulses.

Reference may be made to the following U.S. Pat. Nos. 3,654,495; 3,588,547; 3,575,618; 3,569,842; 3,463,941; 3,073,972; 2,794,123; and 2,653,232.

Timing control units often utilize interchangeable timer cards for generating various control signals at the appropriate time in an operational sequence. Initially, the timer cards are set to a specific time in a test set before they are seated in the control unit. Each timer card is adjusted by automatically restrating the timer after the timer has timed out and measuring the output with a digital counter. The timer card, however, has a maximum recovery time before it can be restarted. For example, the recovery time can be as much as 20 msec. If the timer is restarted before the complete recovery time has expired, the timer card output will not be constant, and it would be adjusted for a shorter time than is required. It is desirable therefore to delay the restart pulse, which is synchronized with the timer output, by at least 20 msec.

SUMMARY OF THE INVENTION

In accordance with the present invention an apparatus is provided for generating a first series of slow output pulses and a second corresponding series of delayed output pulses. In a specific embodiment of the invention the apparatus comprises an astable oscillator for generating the first slow output pulses and an adjustable monostable oscillator for generating an adjustably delayed pulse in response to each first output pulse, the adjustably delayed pulse continuing until the monostable oscillator is reset by the next slow output pulse. Pulse shortening means are provided for processing the adjustably delayed pulses to provide the delayed output pulse. The pulse shortening means terminates the delayed output pulse after a predetermined time interval to reduce the pulse width of the delayed output pulses relative to the adjustably delayed pulses.

In particular, the novel pulse shortening apparatus includes an amplifier which is normally ON during the interval coinciding with the adjustably delayed pulse, a capacitor for developing a control potential as it is discharged at a predetermined rate during the adjustably delayed pulse interval, and switching means for turning the amplifier OFF during the adjustably delayed pulse interval responsive to the control potential falling below a threshold level.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

DETAILED DESCRIPTION

Figure 1:
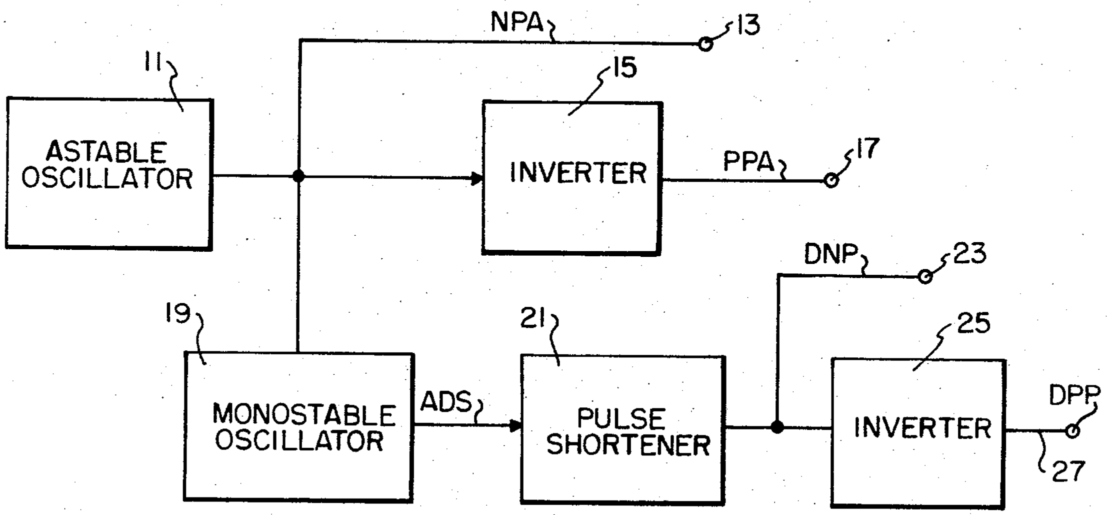
FIG. 1 is a block diagram of adjustable slow and delayed pulse oscillator apparatus in accordance with the principles of the present invention.

In accordance with the principles of the present invention, the adjustable slow and delayed pulse oscillator shown in FIG. 1 is effective to generate a first series of slow output pulses and a second corresponding series of delayed output pulses, each of the delayed pulses following the corresponding slow pulse by a selectable time interval.

Figure 2:
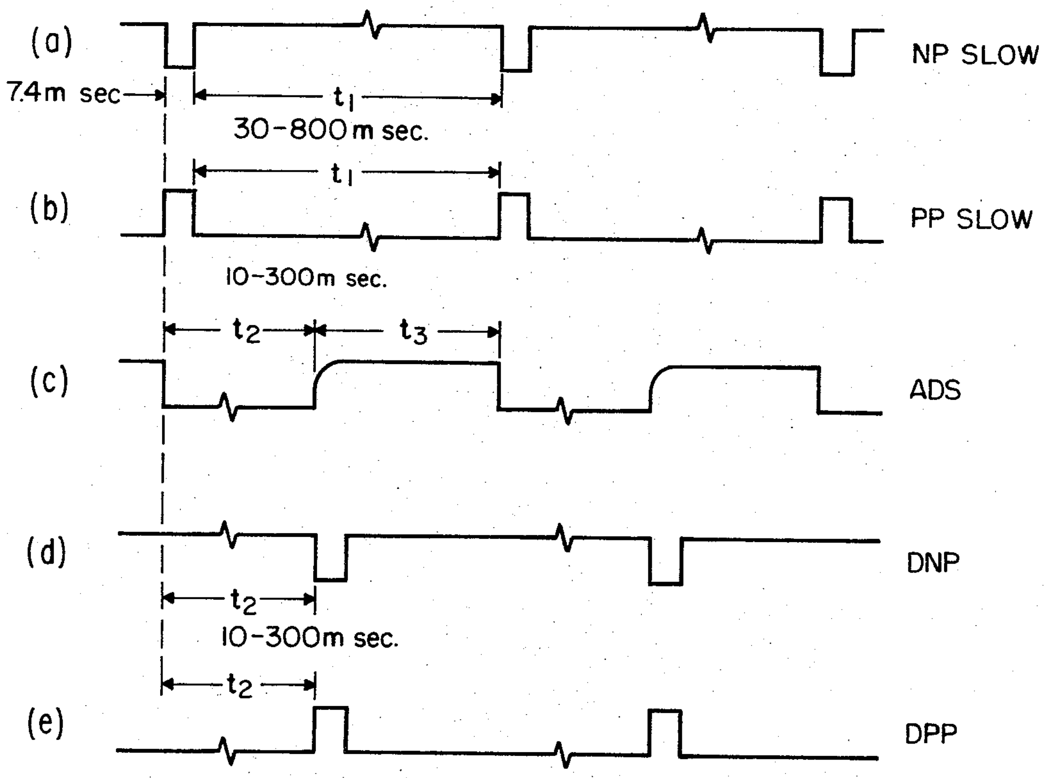
FIG. 2 (*a*)–(*e*) illustrate waveforms generated by the apparatus of the present invention and useful in understanding its operation.

More particularly, with reference also to FIG. 2, the adjustable slow and delayed pulse apparatus includes a free-running astable oscillator 11 for generating a series of negative polarity (NP) slow output pulses at output terminal 13. In addition, the NP slow pulse train is coupled through an inverter 15 to provide a corresponding series of positive polarity (PP) slow pulses at output terminal 17. The oscillator 11 is adjustable so that the interval between adjacent slow output pulses, i.e., interval $t_1$ in FIGS. 2*a* and 2*b*, can be selectively adjusted as required by the user.

The negative-going slow pulses produced at the output of astable oscillator 11 also periodically trigger an adjustable monostable oscillator 19 which, in turn, generates the pulse train shown in FIG. 2*c*. There, it may be seen that each pulse is delayed relative to the corresponding slow pulse, the duration of the delay (i.e., interval $t_2$ in FIG. 2*c*) being determined by the adjustment of the monostable oscillator 19. The delayed pulse ends upon the receipt of the next slow pulse. Accordingly, the resultant pulse train (FIG. 2*c*) is hereinafter referred to as the adjustable delayed (ADS) signal.

The ADS signal or pulse is then coupled to a pulse shortener 21 where it is processed to provide a delayed negative polarity (DNP) output pulse of reduced width, such as that shown in FIG. 2*d*, at output terminal 23. The resultant DNP output pulse train is subsequently coupled to an inverter 25 to provide corresponding delayed positive polarity (DPP) output pulses at output terminal 27 (FIG. 2*e*).

Figure 3:
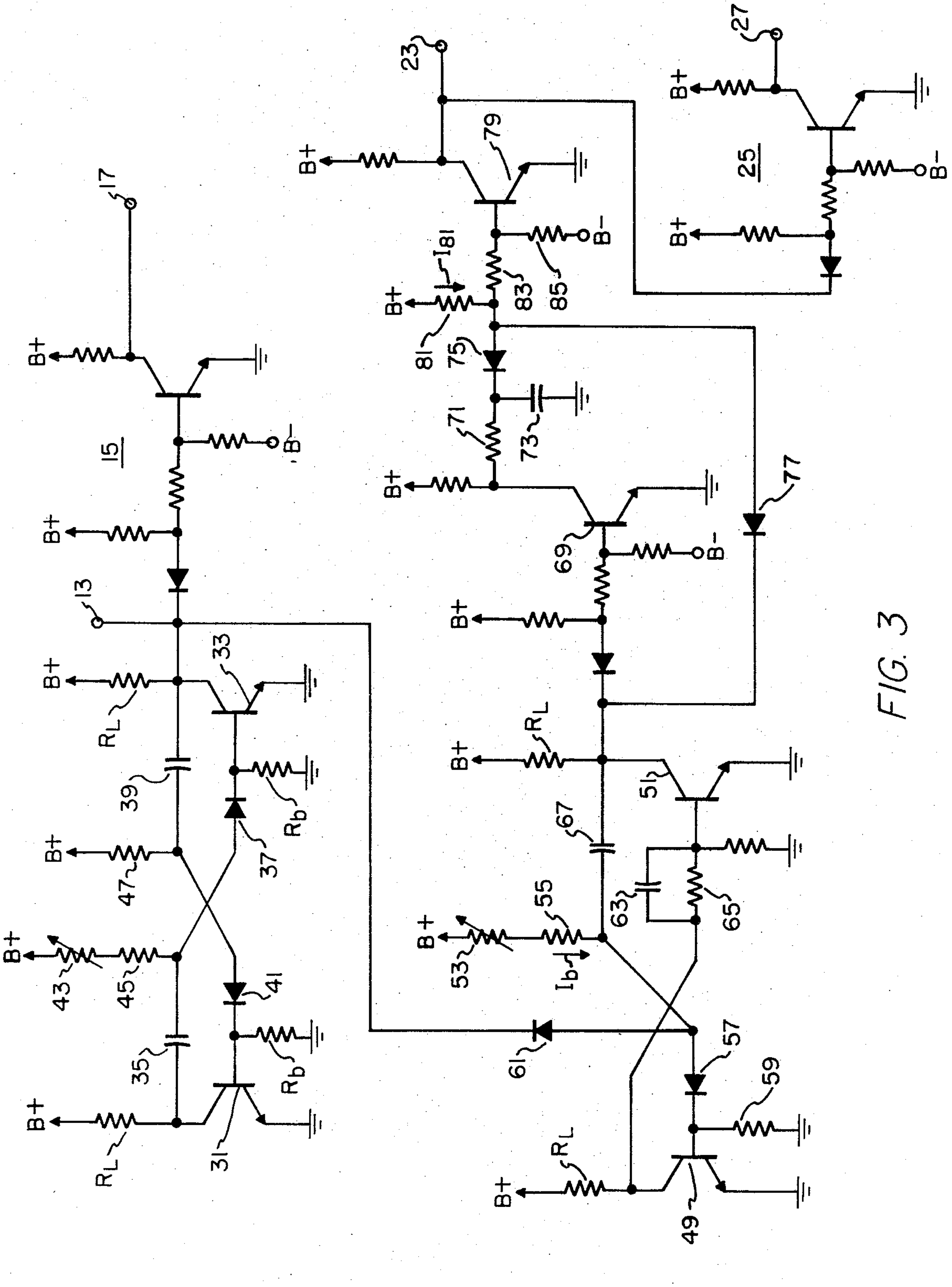
FIG. 3 is a schematic diagram of an embodiment of the adjustable slow and delayed pulse oscillator constructed in accordance with the principles of the present invention.

The apparatus comprising the adjustable slow and delayed pulse oscillator of the present invention is shown in greater detail in FIG. 3, and its operation may be better understood by reference thereto.

In the detailed embodiment illustrated in FIG. 3, the astable oscillator comprises a pair of transistors, 31 and 33, interconnected in the basic free-running astable collector-coupled multivibrator configuration which is well-known in the prior art.

That is, the respective collector electrodes of transistors 31 and 33 are connected to a source of operating (B+) potential, e.g., +12 vdc, through corresponding load resistors, $R_L$, while their respective emitter electrodes are connected directly to ground. The base electrodes of transistors 31 and 33 are referenced to ground through corresponding bias resistors, $R_b$.

Moreover, the collector electrode of transistor 31 is coupled to the base electrode of transistor 33 by capacitor 35 and diode 37, and in identical fashion, the collector electrode of transistor 33 is coupled to the base electrode of transistor 31 by capacitor 39 and diode 41. Since transistors 31 and 33 are capacitive coupled, neither transistor can remain permanently cut off. Instead, the astable multivibrator has two quasi-stable states, making periodic transitions between these states. Thus, when transistor 31 is conductive (ON), transistor 33 is non-conductive (OFF), and vice versa.

A variable resistor 43 and a fixed resistor 45 are serially connected between the B+ operating potential and the junction of capacitor 35 and diode 37. Consequently, during the intervals when transistor 31 is conductive, capacitor 35 is charged by the current conducted through the current path comprising variable resistor 43, resistor 45, and transistor 31 while capacitor 39 is simultaneously discharged. Capacitor 35 continues to charge until the potential developed thereacross is sufficient to bias transistor 33 into conduction. The resultant drop in potential at the collector electrode of transistor 33, in turn, switches transistor 31 OFF.

During intervals when transistor 33 is ON, capacitor 35 is discharged, and capacitor 39 is charged through resistor 47 and transistor 33 until the potential across capacitor 39 biases transistor 31 into conduction. Accordingly, transistor 33 is switched OFF responsive to the reduced collector potential developed by transistor 31, the potential at the collector electrode of transistor 33 rising toward B+ to maintain transistor 31 in conduction until the potential developed across capacitor 35 is sufficient to again turn transistor 33 ON.

As transistor 33 is alternately switched ON and OFF, the resultant potential fluctuations at its collector electrode give rise to a series of negative-going pulses (i.e., the NP slow output pulses of FIG. 2*a*) at output terminal 13, each pulse corresponding to an interval when transistor 33 is ON. The pulse width is determined by the charging time constant $0.7\ C_{39}R_{47}$, of capacitor 39. Since capacitor 39 and resistor 47 are fixed components, the pulse width is set at a predetermined value, e.g., 7.4 msec (FIG. 2*a*) in the present embodiment. The time interval between successive pulses, however, is dependent on the ON time of transistor 31, which, in turn, is dependent on the length of time it takes capacitor 35 to charge to the conduction threshold of transistor 33. The rate at which capacitor 35 is charged is determined by the time constant of its charging current path, i.e., $0.7\ C_{35}\ (R_{43} + R_{45})$. Accordingly, the interval between pulses can be varied by adjusting variable resistor 43 to modify the time constant. In the present embodiment, for example, the interval ($t_2$) can be set between 30 msec and 800 msec (FIG. 2*a*).

The negative polarity slow output pulses are further coupled from the collector electrode of transistor 33 to an inverter circuit, identified generally at 15. The particular inverter circuit shown in FIG. 3 is well-known in the prior art, and accordingly, its operation will not be reviewed at this time. It is sufficient to note that inverter 15 is operative to invert the negative-going slow output pulses developed by the astable multivibrator, thereby providing corresponding positive polarity (PP) slow output pulses at its output terminal 17.

In addition, the slow output pulses are also coupled to a monostable oscillator comprising a pair of transistors, 49 and 51, interconnected to form a collector-coupled monostable, or one-shot, multivibrator similar to those already known in the art.

When the monostable multivibrator arrangement of the present embodiment is in its stable state, transistor 49 and transistor 51 are ON and OFF, respectively. A trigger signal applied to the monostable, however, will induce a transition from the stable state to a quasi-stable state in which transistor 49 is OFF and transistor 51 is conducting. The monostable will then remain in the quasistable state until it finally returns to its original state by itself after a predetermined time interval.

More particularly, the respective collector electrodes of transistors 49 and 51 are coupled to the B+ potential through corresponding load resistors, $R_L$, while respective emitter electrodes are connected directly to ground. A bias potential is supplied to the base electrode of transistor 49 and its connection with the junction of diode 57 and resistor 59, diode 57 and resistor 59 combining with variable resistor 53 and resistor 55 to form a voltage divider network between B+ and ground.

The negative polarity slow pulses (FIG. 2*a*) developed at the collector electrode of transistor 33 are coupled through diode 61 to the junction of diode 57 and resistor 55 to trigger the monostable multivibrator into its quasi-stable state. Operationally, at a point in time coincident with the leading edge of the negative-going slow output pulse, diode 61 is forward biased for the duration of the slow pulse. Consequently, the bias current, $I_b$, is diverted through diode 61 and transistor 33 to ground, and as a result, the bias voltage at the base electrode of transistor 49 drops below the conduction threshold, turning transistor 49 OFF.

As transistor 49 is turned OFF, however, the voltage at its collector electrode rises toward B+ potential. The collector electrode of transistor 49 is coupled to the base electrode of transistor 51 through a parallel network comprising capacitor 63 and resistor 65. Thus, the increased collector potential of transistor 49 will bias transistor 51 into conduction. Moreover, when transistor 51 is switched ON, the potential at its collector electrode drops toward 0 vdc. This negative voltage transition is coupled to the base electrode of transistor 49 through capacitor 67 to maintain transistor 49 in its cut off condition.

As soon as the trigger signal ends, i.e., the negative polarity slow pulse, diode 61 is reversed biased, and the bias current ($I_b$) charges capacitor 67 until the potential developed thereacross is sufficient to switch transistor 49 ON. In turn, transistor 51 is switched OFF so that the $I_b$ current is conducted through the base biasing network (i.e., resistor $R_b$) of transistor 49.

Accordingly, the interval during which transistor 51 is ON, i.e., interval $t_2$ in FIG. 2*c*, is equal to the width of the trigger pulse plus the time required to charge capacitor 67 to the conduction threshold level of transistor 49. The charging time of capacitor 67, in turn, is determined by the time constant, $0.7\ C_{67}\ (R_{53} + R_{55})$. The time constant can therefore be adjusted by the user to delay the time at which transistor 51 is switched OFF. Thus, the pulses developed at the collector electrode of transistor 51 comprise an adjustable delayed (ADS) signal which can be adjusted so that the ADS pulses are delayed relative to the triggering slow pulse by a selected time interval ($t_2$).

The positive-going ADS pulses (FIG. 2*c*) are subsequently coupled from the collector electrode of transistor 51 to the pulse shortener circuit. The pulse shortener includes an inverter comprising transistor 69. Consequently, the signal appearing at the collector electrode of inverter transistor 69 is an inverted ADS signal; that is, the ADS pulses are negative-going.

The inverted ADS pulses are, in turn, coupled through resistor 71 to periodically recharge capacitor 73. In particular, during the intervals between ADS pulses, i.e., interval $t_2$ in FIG. 2*c*, the ADS signal is at about 0 vdc, and accordingly, the potential developed at the collector electrode of inverter transistor 69, which is non-conductive, is about +12 vdc. Consequently, capacitor 73 is charged through resistor 71. The charge stored in capacitor 73, in turn, develops a potential thereacross which reverse biases diode 75.

Moreover, diode 77, which interconnects the collector electrode of transistor 51 and the base electrode of transistor 79 in the inverting amplifier circuit coupled to diode 75, is forward biased. Diode 77 is effective to conduct the bias current ($I_{81}$) from resistor 81 in the base biasing circuitry of transistor 79 to ground through transistor 51 so that transistor 79 is non-conductive.

During the ADS pulse interval (i.e., interval $t_3$ in FIG. 2*c*), however, diode 77 is reversed biased by the increased potential at the collector electrode of transistor 51. Accordingly, the current ($I_{81}$) through resistor 81 is conducted through resistors 83 and 85 to develop bias voltage at their junction which is sufficient to switch transistor 79 into conduction. As a result, the potential developed at the collector electrode of transistor 79 drops toward 0 vdc. This is the leading edge of the delayed negative output pulse shown in FIG. 2*d* which is developed at output terminal 23 (i.e., the collector electrode of transistor 79).

During the ADS pulse (interval $t_3$), transistor 69 is switched ON to provide a low level potential (e.g., about 0 vdc) at its collector electrode. When transistor 69 begins conducting, capacitor 73 is discharged through resistor 71 and transistor 69 until it is discharged sufficiently so that diode 75 is forward biased. When diode 75 begins conducting, the bias current ($I_{81}$) through resistor 81 is again diverted from the base biasing circuitry of transistor 79. At this time, however, the current, $I_{81}$, is to ground through diode 75, resistor 71 and transistor 69. Accordingly, although the ADS pulse has not yet ended, transistor 79 is switched OFF to complete the delayed output pulse (FIG. 2*d*) developed at its collector electrode. Rather, the width of the negative-going delayed output pulse is determined by the discharging time constant of capacitor 73, i.e., $0.7 \times C_{73} \times R_{71}$.

During the next interval between ADS pulses ($t_2$), transistor 69 is again turned OFF, and capacitor 73 once again charges toward B+ to reverse bias diode 75. Diode 77 is forward biased, and the current through resistor 81 flows through diode 77 and transistor 51 to maintain transistor 79 and its non-conductive state. Subsequently, the delayed negative polarity (DNP) output pulses are coupled through an inverter, identified generally at 25, to develop delayed positive polarity (DPP) output pulses at output terminal 27.

Accordingly, it can be seen from the wave forms of FIG. 2 that a shortened delayed negative output pulse (DNP) is generated at the output of the pulse shortener, the collector electrode of transistor 79. The leading edge of the delayed output pulse coincides with the leading edge of the ADS pulse generated by the monostable oscillator, and thus, the delayed output pulse trails the leading edge of the slow output pulse by a selected time interval that is determined by the adjustment of the monostable oscillator's time constant. In the present embodiment the delay can be varied between 10 msec and 300 msec. Similarly, the pulse width of the delayed (DNP) output pulse is determined by the time constant of capacitor 73 in the pulse shortener circuit.

While a particular embodiment of the present invention has been shown and described, it will be obvious to those skilled in the art that various changes and modifications can be made without departing from the invention in its broader aspects. Accordingly, the aim in the appended claims is to cover all such changes and modifications as may fall within the true spirit and scope of the invention.

What is claimed is:

1. Apparatus for developing output pulses of reduced pulse width responsive to corresponding input pulses of larger pulse width comprising:

a capacitor developing a control potential representative of the charge stored therein responsive to the input pulse being coupled thereto, the capacitor being charged during intervals between the input pulses and discharged at a predetermined rate during intervals coinciding with the input pulses;

an amplifier, the amplifier having a biasing arrangement for developing a bias current to maintain the amplifier in an ON state;

first switching means coupled to the amplifier for diverting the bias current from the amplifier during intervals between the input pulses to turn the amplifier OFF; and second switching means coupled between the capacitor and the amplifier for diverting the bias current from the amplifier to turn the amplifier OFF responsive to the control potential falling below a switching threshold.

* * * * *